United States Patent
Hall et al.

(10) Patent No.: US 6,957,246 B1
(45) Date of Patent: Oct. 18, 2005

(54) BUFFER STATUS IN AN ASYMMETRICAL GAP ENVIRONMENT

(75) Inventors: Robert A. Hall, Richardson, TX (US); Stephen P. Kolecki, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 637 days.

(21) Appl. No.: 09/583,966

(22) Filed: May 31, 2000

(51) Int. Cl.[7] .............................................. G06F 15/16
(52) U.S. Cl. ...................... 709/200; 370/359; 370/369; 370/514
(58) Field of Search ................................ 370/476, 464, 370/498, 503, 505, 901, 903, 707, 359, 369, 370/514; 438/455; 709/200

(56) References Cited

U.S. PATENT DOCUMENTS

| | | | | |
|---|---|---|---|---|
| 4,764,941 A | * | 8/1988 | Choi | 375/363 |
| 5,528,598 A | * | 6/1996 | Ng | 370/506 |
| 5,535,219 A | * | 7/1996 | Freitas | 370/509 |
| 5,555,262 A | * | 9/1996 | Urbansky | 370/505 |
| 5,563,890 A | * | 10/1996 | Freitas | 370/476 |
| 5,717,693 A | * | 2/1998 | Baydar et al. | 370/514 |
| 5,872,780 A | * | 2/1999 | Demiray et al. | 370/359 |
| 6,266,333 B1 | * | 7/2001 | Kartalopoulos | 370/395.53 |
| 6,628,651 B1 | * | 9/2003 | Ryan et al. | 370/369 |

* cited by examiner

Primary Examiner—Wen-Tai Lin
(74) Attorney, Agent, or Firm—Campbell Stephenson Ascolese LLP

(57) ABSTRACT

A method for determining a status of a buffer for use in converting between a standard SONET and a non-standard SONET frame is presented. The method determines the buffer's almost empty or almost full status based on a length of a transport gap of the non-standard SONET frame, wherein the standard SONET frame is formatted as a STS-N, and the transport gap of the non-standard SONET frame has been rearranged to provide a longer non-data region at the beginning of the non-standard SONET frame. The method then uses the buffer's almost empty or almost full status to trigger positive or negative stuffing. The method is used for maintaining communications when using asymmetrical gapping structures.

58 Claims, 11 Drawing Sheets

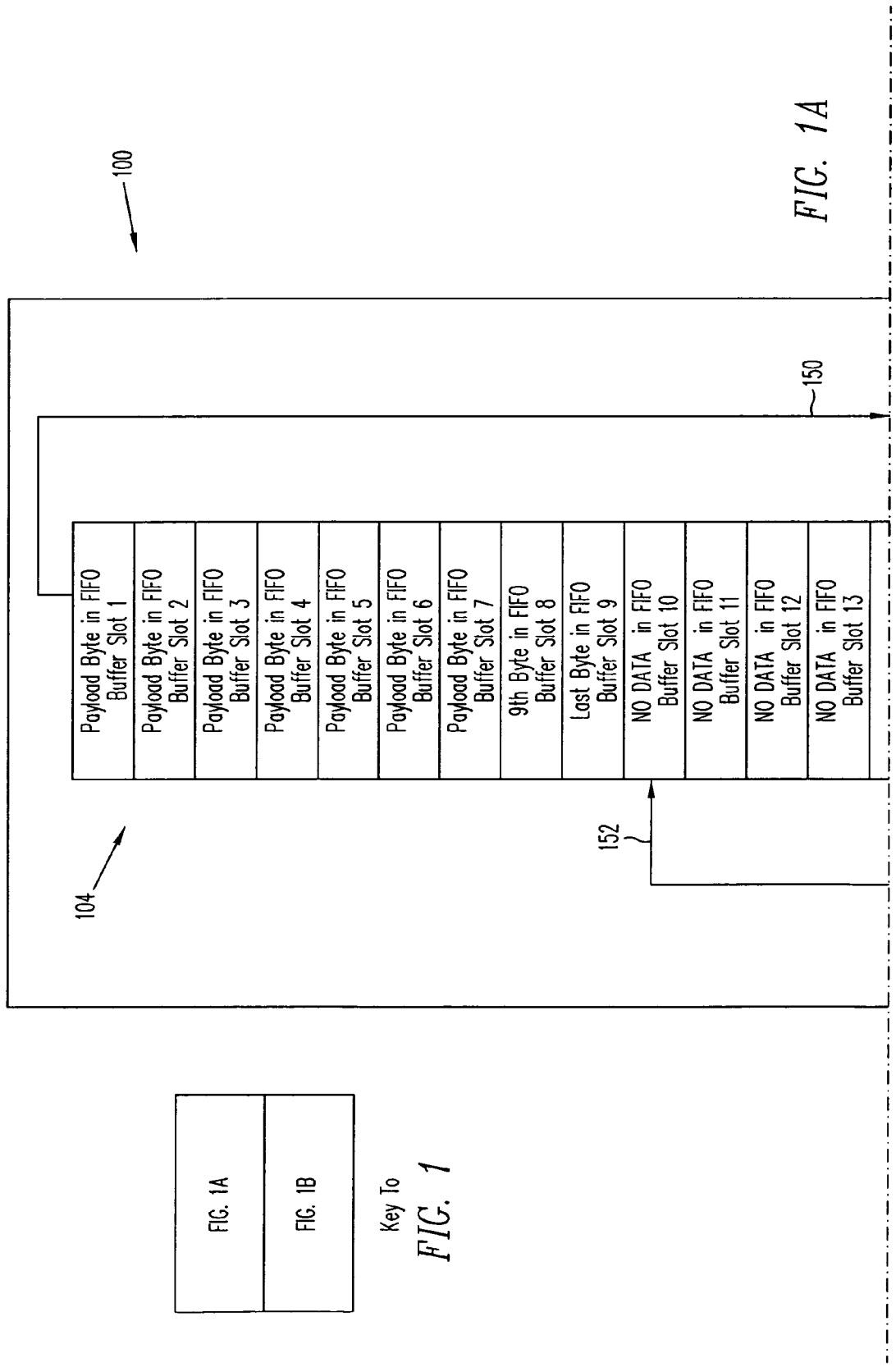

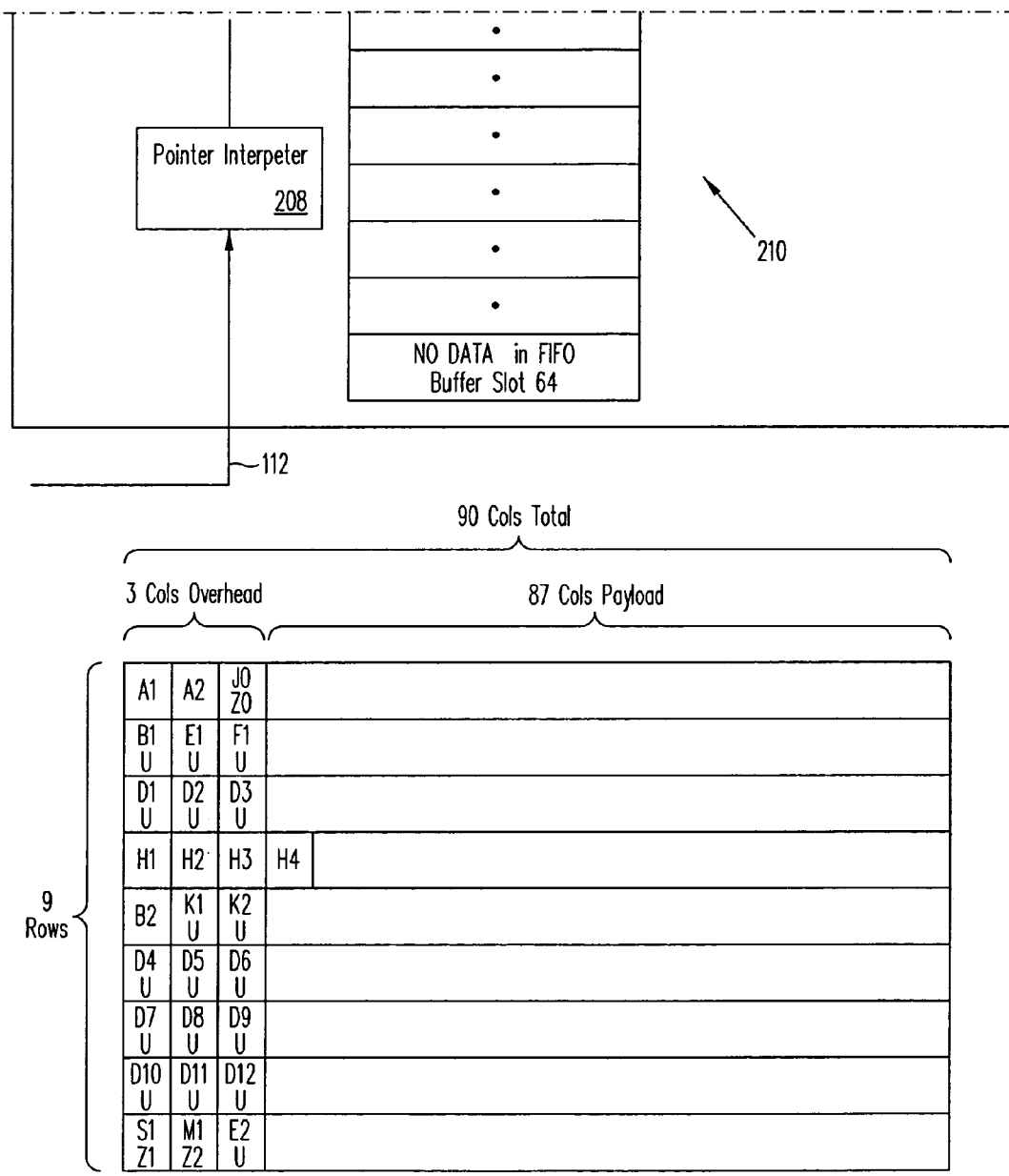
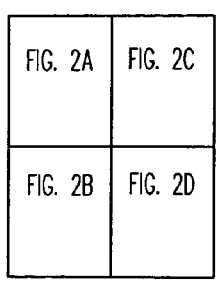
FIG. 2B
Key To
FIG. 2

Key To

BUFFER STATUS IN AN ASYMMETRICAL GAP ENVIRONMENT

BACKGROUND OF THE INVENTION

1. Field of the Invention

The present invention relates, in general, to data communications.

2. Description of the Related Art

A data communications network is the interconnection of two or more communicating entities (i.e., data sources and/or sinks) over one or more data links. A data communications network allows communication between multiple communicating entities over one or more data communications links.

One type of data communications network is the Synchronous Optical Network (SONET). Generally (although not always), SONETs are composed of network nodes strung together in a ring format.

A SONET has several relatively unique features which distinguishes it from other types of data communications networks. One unique feature is that an attempt is made to synchronize all data nodes in a SONET to the same clock system. However, insofar as SONET nodes are typically dispersed over a large geographic area, the clock signals received by each SONET node generally vary from each other in phase (e.g., due to different propagation delays arising from varying distances from a central clock) and/or frequency (e.g., when an attempt is made to synchronize various parts of a SONET to different clocks making up a clock system, where each clock in the system is supposedly synchronized in phase and frequency with every other clock but which in reality vary slightly due to physical variations). Consequently, it is not uncommon for the signals on the SONET node ingress and egress data links to vary slightly from each other either in phase and/or frequency. Consequently, rather than referring to such signals as truly synchronous, it is common in the art to refer to such signals as plesiochronous (i.e., generated by SONET nodes with separate network clocks which vary only slightly in phase and or frequency).

Since the signals on the ingress and egress data links of a SONET node can vary in phase and/or frequency, SONET does not merely rely on timing to ensure that data is correctly transported across nodes. Rather, SONET uses a data structures (called pointers in the SONET nomenclature) to compensate for frequency and phase variations across nodes. (In SONET, a pointer is simply an offset value that points to the byte where a SPE (synchronous payload envelope, which can be thought of as "user data" begins within a data structure known as a standard SONET frame. If relative severe timing differences exist between the ingress and egress data links of a SONET node, "positive stuffing" (e.g., inserting a byte) or negative stuffing (e.g., removing a byte) can be used at each SONET node to adjust for the phase and/or frequency delays, and the pointer adjusted accordingly to ensure that the next node receiving the SONET data structure can discern where a SPE resides.

In practice, since it is not known in advance whether or not the phase and/or frequency difference between ingress and egress data links of a SONET node is severe enough to warrant stuffing (positive or negative), it is common within the art to buffer received SPE data, and engage in positive or negative stuffing dependent upon whether the buffer is almost full or almost empty. If positive stuffing is used the pointer is incremented and if negative stuffing is used the pointer is decremented, thereby allowing correct discernment of the SPE at the next node. The foregoing is explained in brief overview in relation to FIG. 1.

With reference now to FIG. 1, shown is a partial block diagram of typical SONET node 100. Depicted are pointer interpreter 102, FIFO (first in, first out—the first data written into the buffer will be the first data read out of the buffer, which is illustrated via FIFO buffer data-out line 150 being connected directly to the FIFO buffer slot 1 and FIFO buffer data-in line 152 being connected to the first FIFO buffer slot which is empty—data-in line 152 is meant to indicate that SPE data is written to the first empty slot of the buffer; if data is read from the buffer the first empty slot of the buffer will appear closer to FIFO buffer slot 1 (e.g., data-in line 152 would appear in the figure to move up one slot toward buffer slot 1) and as data is written to the buffer the first empty slot of the buffer would appear closer to the last FIFO buffer slot 16 (e.g., data-in line 152 would appear in the figure to move down one slot toward buffer slot 1)) buffer 104, and pointer generator 106. Illustrated are high-level diagrams of standard SONET frames 108 and 110. Shown is that SONET frame 108 enters standard SONET node 100 via ingress data link 112. Depicted is that SONET frame 110 leaves standard SONET node 100 via egress data link 114.

SONET frames 108 and 110 show that each row of each SONET frame has 3 columns of overhead (data utilized to ensure that the SONET works correctly, and which is generally referred to in the art as a 3 column "transport gas," since it represents a gap in the data being transported) and 87 columns of payload (data transmitted through the SONET by SONET users). Those skilled in the art will recognize that the size of each "column" will typically vary dependent upon the number of STS (synchronous transport signals) in use. For example, when one STS is in use (denoted in the art via the symbology "STS-1") each column is 1 byte wide; when two STSes are in use (denoted in the art via the symbology "STS-2"), each column is two bytes wide; when 3 STSes are in use (denoted in the art via the symbology "STS-3"), each column is three bytes wide; etc. In general, the number of bytes per column is a function of the number of STSes in use "N," where N is some positive integer; for example, for STS-48 (i.e., N= 48) each column of each SONET frame would be 48 bytes wide.

For ease of understanding, the discussion from this point forward will generally describe embodiments via use of exemplary STS-1 SONET frames. However, those skilled in the art will appreciate that the discussion herein generalizes to virtually any STS-N SONET frame via multiplying the size of the data structures described herein by the number, N, of STSes in use in any particular implementation.

Referring now again to FIG. 1, notice that FIFO buffer 104 is shown as being finite in size (e.g., as having 16 slots). Hence, pointer interpreter 102 needs to be apprised as to when FIFO 104 is "almost full" so that pointer interpreter 102 does not inadvertently overwrite data in FIFO 104. If pointer interpreter 102 and pointer generator 106 find that FIFO 104 is almost full, pointer interpreter 102 and pointer generator 106 engage in appropriate action to ensure that data is not overwritten in FIFO 104 and that pointer generator 106 adjusts the pointer value sufficient to reflect the fact that at least one byte will not be written into FIFO 104 (e.g., the pointer is decremented to reflect negative stuffing).

If pointer interpreter 102 and pointer generator 106 find that FIFO 104 is almost empty, pointer interpreter 102 and pointer generator 106 engage in appropriate action to ensure that data is written into FIFO 104 sufficient such that data always exists in FIFO 104 sufficient such that a constant outflow of data can be maintained on egress line 114 and such that that pointer generator 106 adjusts the pointer value sufficient to reflect the fact that at least one extra byte will be written into FIFO 104 (e.g., the pointer is incremented to reflect the positive stuffing).

It has been discovered by the inventors named herein (the inventors), and such discovery forms part of the inventive content herein, that—irrespective of the fact that pointer interpreter 102 and pointer generator 106 view FIFO buffer 104 from the different standpoints of FIFO buffer data-in line 152 and FIFO buffer data-out line 150, respectively—pointer interpreter 102 and pointer generator 106 can achieve appropriate positive or negative stuffing using the same indicators of "almost empty" or "almost full" full buffers since both pointer interpreter 102 and pointer generator 106 are keyed to standard SONET frame formats. It has been discovered by the inventors, and such discovery forms part of the inventive content herein, that if either pointer interpreter 102 or pointer generator 106 is keyed to a non-standard SONET frame format (e.g., such as is described in copending application, entitled Method And Apparatus For A Rearrangeably Non-Blocking Switching Matrix, naming Saleh, Ali Najib; Duschatko, Douglas E.; and Quibodeaux, Lane Byron as inventors, having Ser. No. 09/477,166, filed Jan. 4, 2000 and hereby incorporated by reference in its entirety), severe difficulties arise with respect to determining the almost empty and almost full buffer conditions, which consequently give rise to difficulties in performing appropriate negative and/or positive stuffing.

SUMMARY

The inventors named herein have invented a method and system which allow for appropriate positive and negative stuffing when either or both a pointer interpreter or a pointer generator are keyed to a non-standard SONET frame format.

In one embodiment, a method includes but is not limited to keying a buffer status to a transport gap other than a standard SONET transport gap (i.e., linking or associating a transmit or receive buffer status, such as "almost full" or "almost empty", to characteristics of a non-standard transport gap). In various embodiments, hardware and/or software are utilized to effect the foregoing-described method. In one embodiment, the foregoing referenced buffer status is that of a transmit buffer. In one embodiment, the foregoing referenced buffer status is that of a receive buffer.

In one embodiment, a method includes but is not limited to detecting a transition involving at least one SONET frame; engaging in negative stuffing, in response to the detecting yielding a determination that a receive FIFO buffer is almost full during the transition involving at least one SONET frame; and engaging in positive stuffing, in response to the detecting yielding a determination that a receive FIFO buffer is almost empty during the transition involving at least one SONET frame. In various embodiments, hardware and/or software are utilized to effect the foregoing-described method.

In one embodiment, a method includes but is not limited to detecting a transition involving at least one SONET frame; engaging in negative stuffing, in response to said detecting yielding a determination that a transmit FIFO buffer is almost full during the transition involving at least one SONET frame; and engaging in positive stuffing, in response to said detecting yielding a determination that a transmit FIFO buffer is almost empty during the transition involving at least one SONET frame. In various embodiments, hardware and/or software are utilized to effect the foregoing-described method.

In one embodiment, a SONET node includes but is not limited to at least one pointer interpreter having an almost full buffer detector set substantially equal to a number of columns present in a non-standard SONET transport gap. In one embodiment, a SONET node includes but is not limited to at least one pointer generator having an almost empty buffer detector set substantially equal to a number of columns present in a non-standard SONET transport gap. In one embodiment, a SONET node includes but is not limited to one or more components selected from the group comprising a processor, a memory device, a bus, and a communications device. In one embodiment, a SONET node includes but is not limited to a Cisco Systems ONS (Optical Network System) 15900 Series Wavelength Router.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following sets forth a detailed description of the best contemplated mode for carrying out the independent invention(s) described herein. The description is intended to be illustrative and should not be taken to be limiting.

Figure 1B:
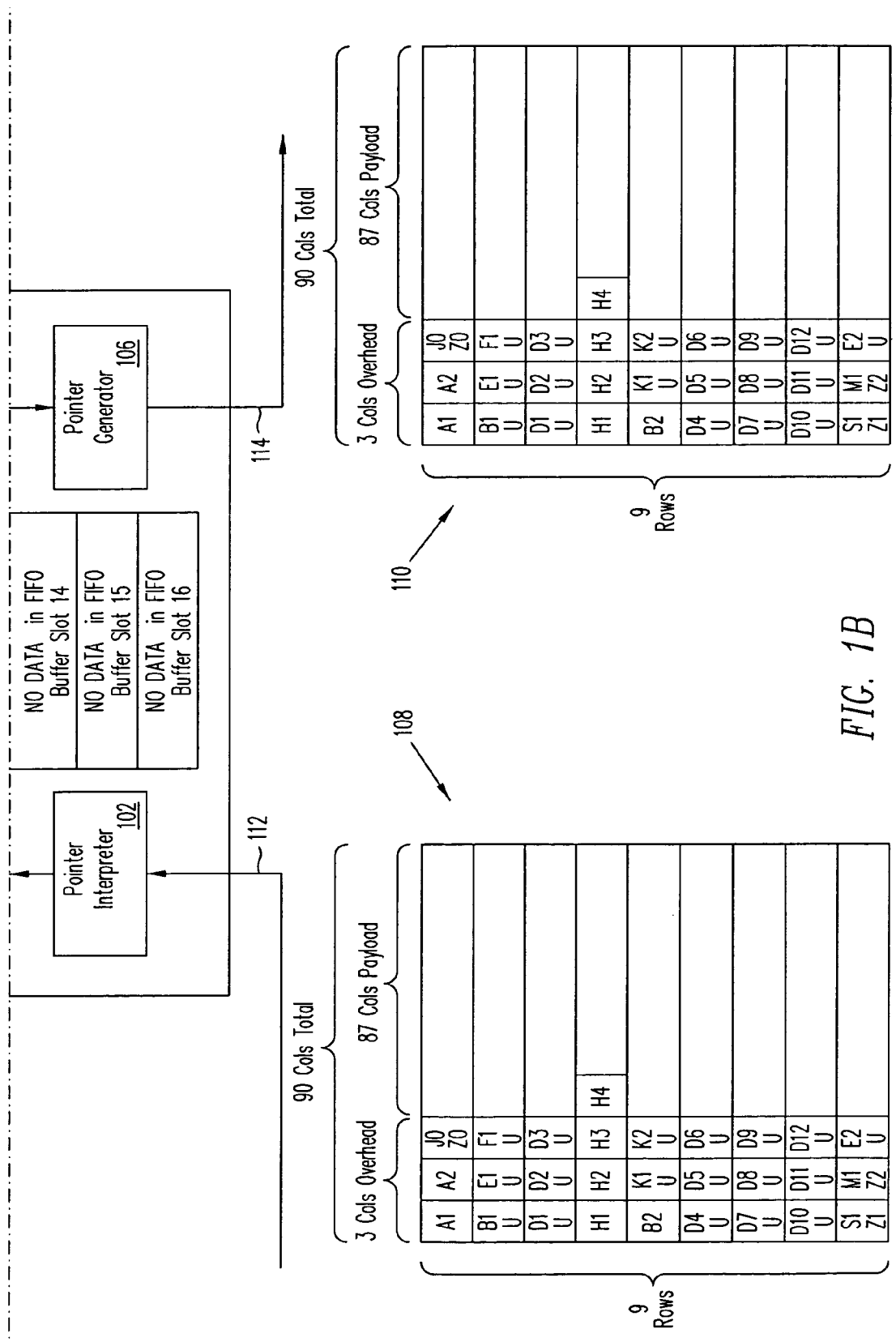
FIG. 1 shows a partial block diagram of typical SONET node 100.
Figure 2A:
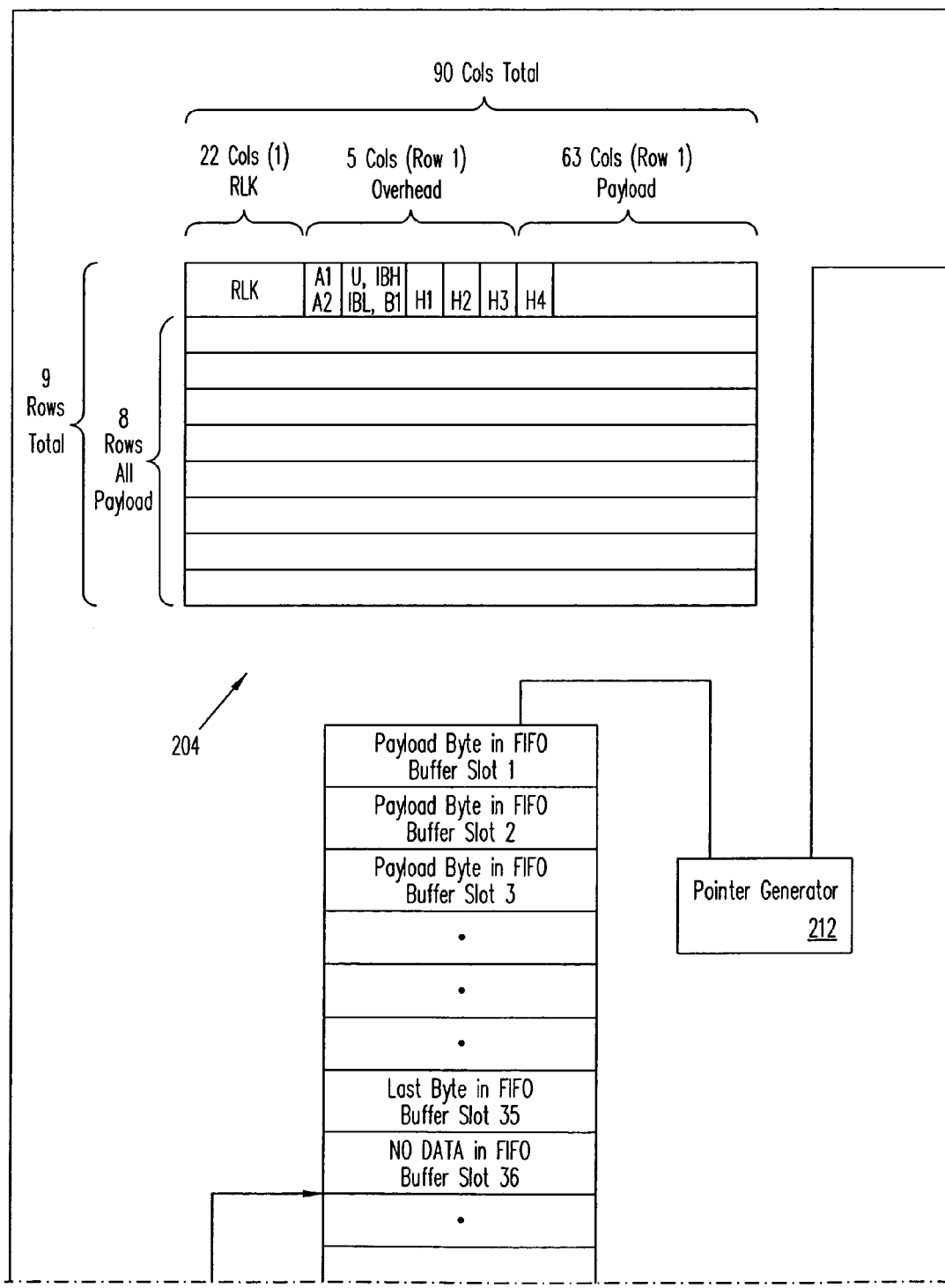
FIG. 2 depicts the partial block diagram of typical SONET node 100 of FIG. 1, modified to become modified SONET node 200.
Figure 2C:
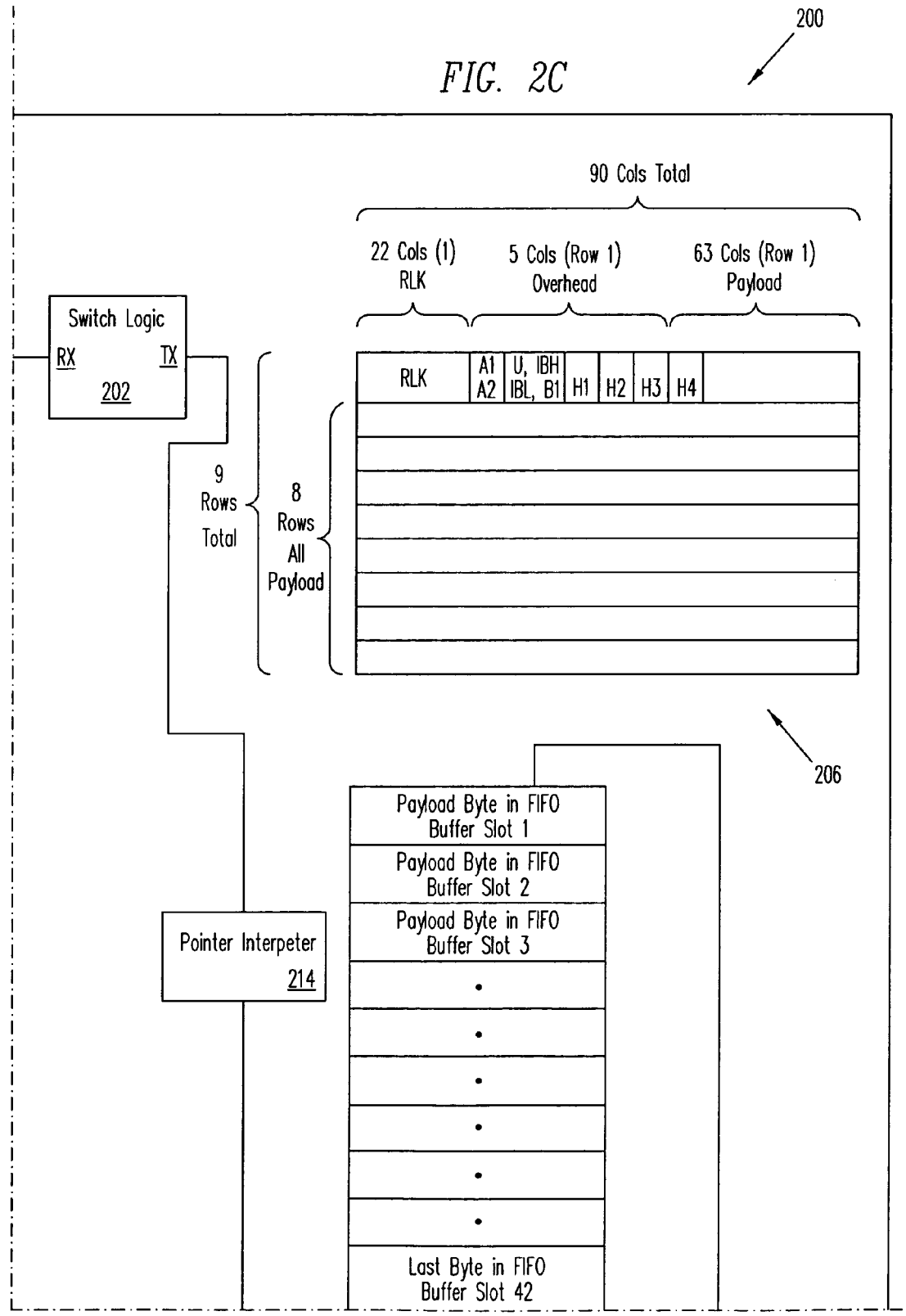
Figure 2D:
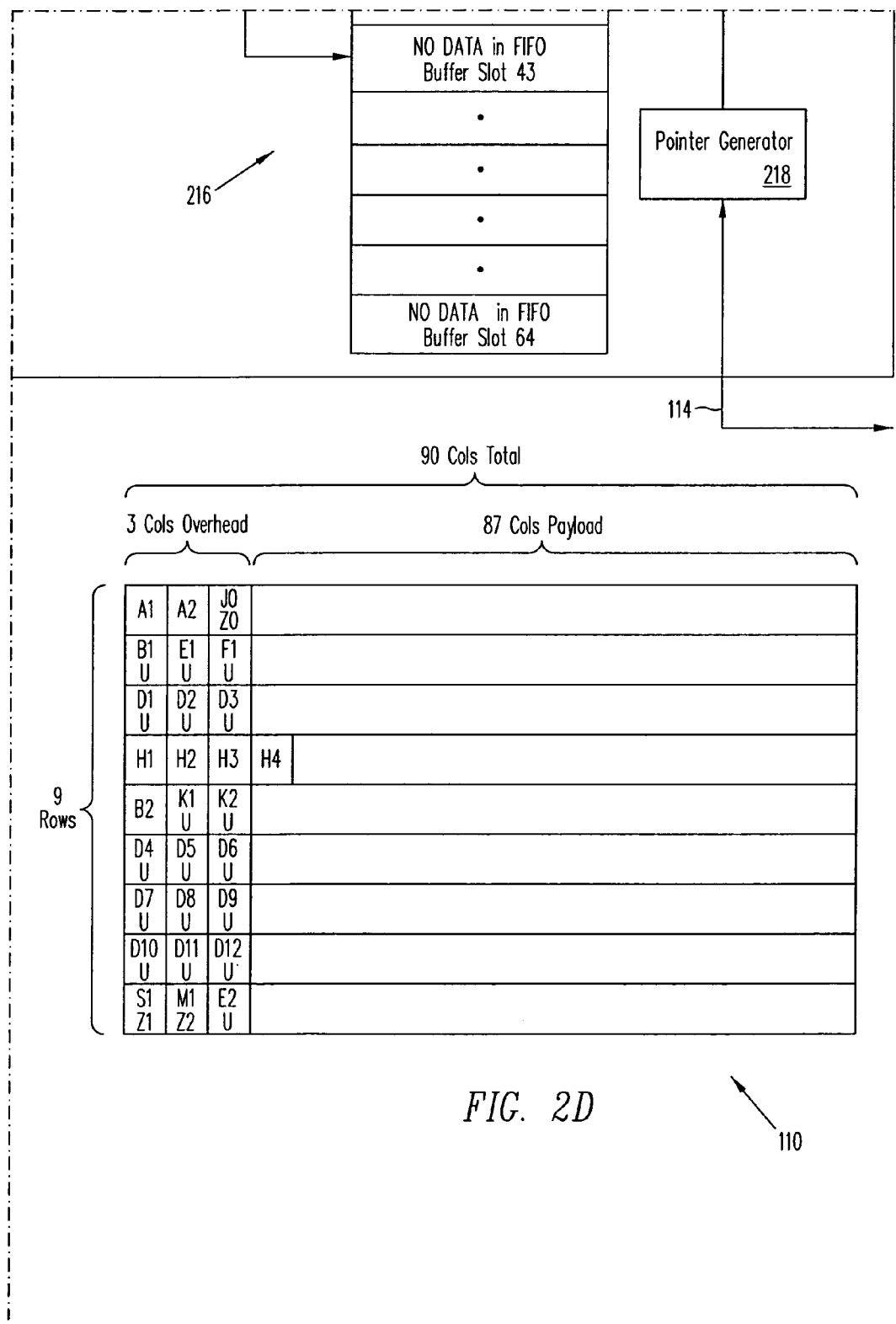

Referring now to FIG. 2, shown is the partial block diagram of typical SONET node 100 of FIG. 1, modified to become modified SONET node 200. Depicted is that, with respect to other SONET nodes interacting with modified SONET node 200 over ingress data link 112 and egress data link 114, modified SONET node 200 appears to function in substantially the same fashion as unmodified SONET node 100.

Illustrated is that internal to modified SONET node 200, the functioning is radically different from that of unmodified SONET node 100. Shown is that switch logic 202 operates on and functions with non-standard SONET frames 204 and 206. Shown is that modified SONET node 200 uses non-standard SONET frames—such as non-standard SONET frames 204 and 206—internal to itself, and yet appears to SONET nodes communicating over ingress data link 112 and egress data link 114 "as if" it were an unmodified SONET node. That is, modified SONET node 200 still receives standard SONET frames, such as standard SONET frame 108, over ingress data link 112 and still transmits standard SONET frames, such as standard SONET frame 110, over egress data link 114.

Making modified SONET node 200 appear "as if" it were unmodified SONET node 100 is achieved on the "receive" side of switch logic 202 (associated with ingress data link 112) by constructing non-standard SONET frames, such as non-standard SONET frame 204, from received standard SONET frames, such as standard SONET frame 108. Making modified SONET node 200 appear "as if" it were unmodified SONET node 100 is achieved on the "transmit" side of switch logic 202 (associated with ingress data link 112) by constructing standard SONET frames, such as standard SONET frame 110, from non-standard SONET frames, such as non-standard SONET frame 206.

On the "receive" side of switch logic 202 this is accomplished via pointer interpreter 208 and pointer generator 212. Pointer interpreter 208 interprets the overhead columns of standard SONET frame 108 and writes the payload (SPE) columns of standard SONET frame 108 into FIFO buffer 210. Pointer generator 212 interacts with pointer interpreter 208 to obtain the 27 columns of overhead data (3 columns/row×9 rows/SONET frame×1 byte/column (for STS-1 frames) yields 27 columns of overhead data/SONET frame—for STS-1; numbers would be multiplied by factor of N other STSes, such as STS-N were in use) in order to construct the 27 column overhead data structure of non-standard SONET frame 204 (which, since it also is representative of a gap in the payload data, can also be viewed as a "transport gap," in a fashion analogous to the way the 3 column structure "transport gap" of the related art is viewed), to which is appended the payload data of standard STS frame 108.

It has been discovered by the inventors that since pointer interpreter 208 and pointer generator 212 are associated with different frame structures (e.g., standard SONET frame 108 and non-standard SONET frame 204 respectively), a status of "almost full" or "almost empty" for a FIFO buffer 210 will vary dependent upon whether FIFO buffer 210 is being viewed from the standpoint of pointer interpreter 208 or pointer generator 212. For example, since pointer interpreter 208 tends to cooperate in writing 87 column "chunks" of payload data (e.g., the number of columns between overhead columns) to FIFO buffer 210, what constitutes "almost empty" and "almost full" from the standpoint of pointer interpreter 208 will be different from that seen by pointer generator 202, which tends to read out the entire payload contents from FIFO buffer 210 en masse subsequent to the construction of the 27 byte overhead data structure of non-standard SONET frame 204.

That is, insofar as pointer generator 212 generally processes all 27 columns of overhead data prior to reading any payload data from FIFO buffer 210, in order to be sure that data in FIFO buffer 210 is not overwritten, pointer interpreter 208 should treat the "almost full" condition as that condition in which FIFO buffer 210 is at least 27 bytes away from being full, in order to account for the eventuality that pointer interpreter 208 will need to write 27 columns of SPE data while pointer generator 212 is in the process of constructing the 27 column overhead data structure of non-standard SONET frame 204 (and hence not reading data from FIFO buffer 210), so that pointer interpreter 208 can prepare to do negative stuffing should the need arise.

Conversely, insofar as pointer generator 212 is concerned, there could be instances in which pointer interpreter 208 is reading three columns of overhead data and not writing data to FIFO buffer 210. Consequently, in order to be safe, pointer generator 212 can treat the "almost empty" indicator as a set number of columns of data away from a completely empty FIFO buffer 210. In one embodiment, the set number of columns can be three columns away from a completely empty FIFO buffer (which for an STS-1 frame equates to 3 bytes), i.e., should the buffer contain three or fewer columns of data it would be considered "almost empty." However, in at least one implementation it has been empirically determined that due to practical considerations it is useful to have the "almost empty" indicator set to five columns (which for an STS-1 frame equates to 5 bytes), i.e. should the buffer contain five or fewer columns of data it would be considered "almost empty."

Figure 3A:
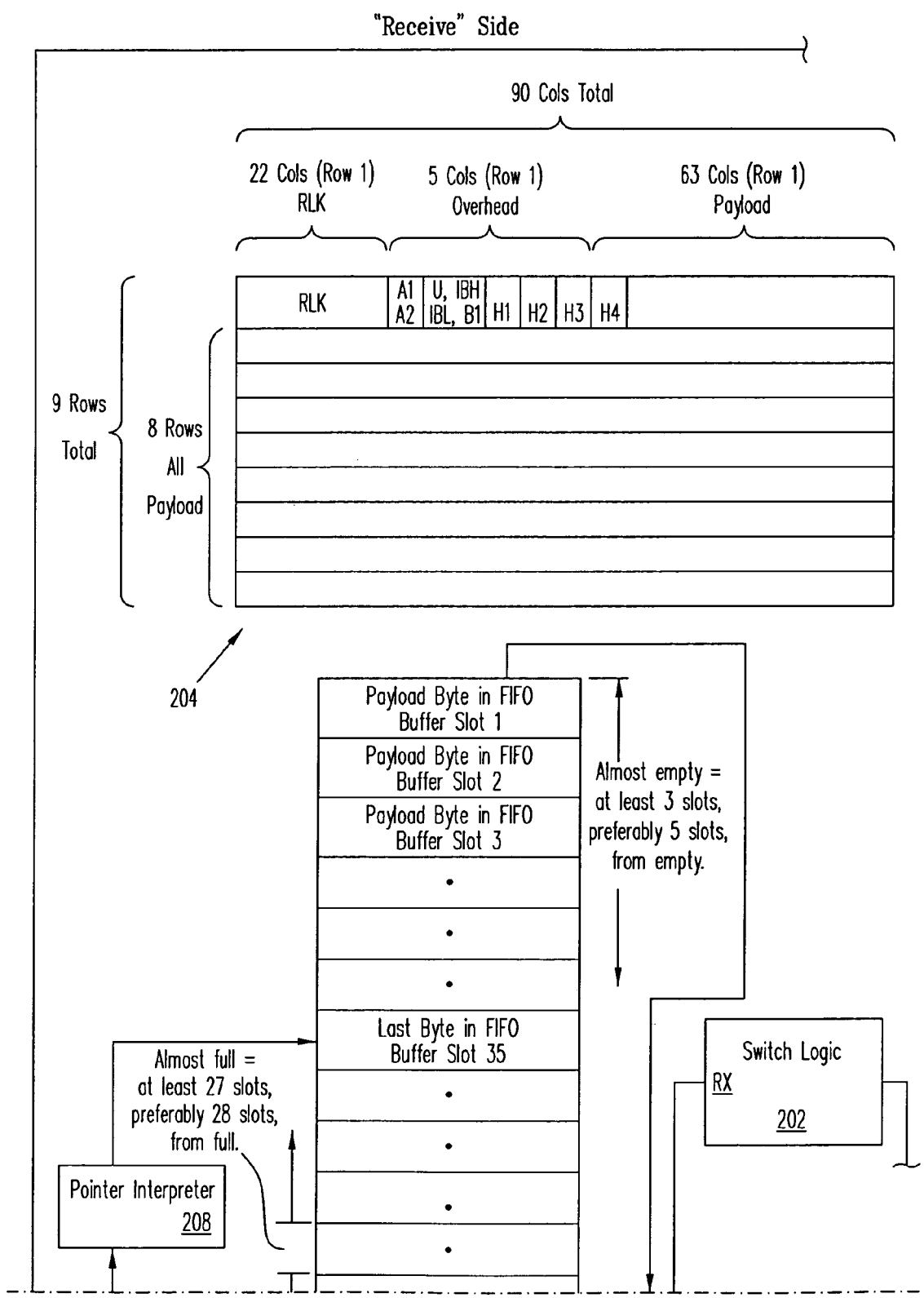
FIG. 3 illustrates an expanded partial view of the "receive" side of switch logic 202 wherein a pointer interpreter 208 treats as "almost full" FIFO buffer 210 when it is a selected number of slots (where each slot is of size sufficient to hold at least one column of SPE data) away from being completely full. In the illustrated embodiment, an "almost full" status is set to 27 slots from the buffer being completely full.
Figure 3B:
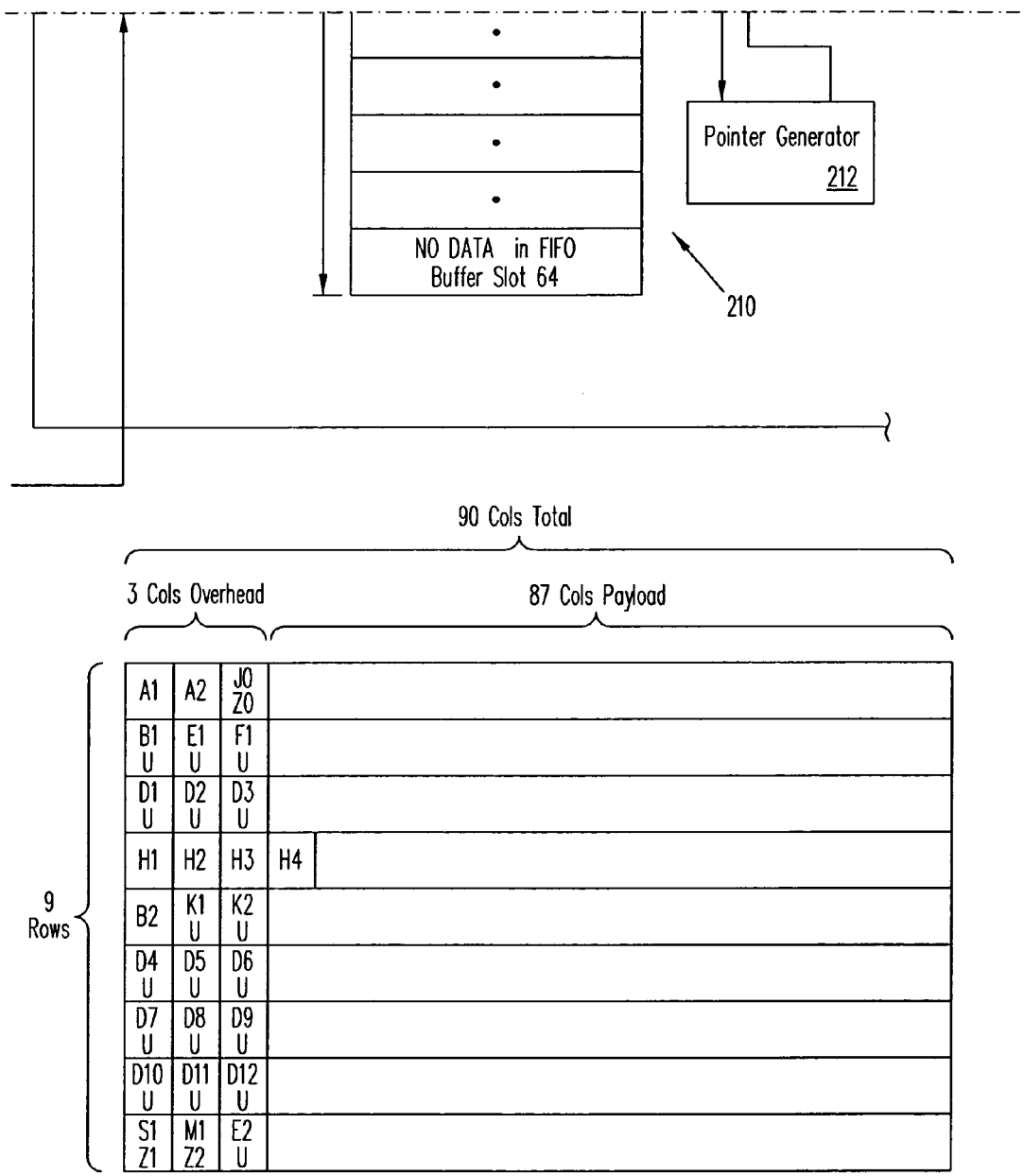

Referring now to FIG. 3 shown is an expanded partial view of the "receive" side of switch logic 202 wherein it is shown that in one embodiment pointer interpreter 208 treats as "almost full" FIFO buffer 210 when it is twenty-seven (27) or less slots (where each slot is of size sufficient to hold at least one column of SPE data) away from being completely full; also shown is that in one embodiment almost full is treated as twenty-eight (28) slots or less for reasons of practicality. Also shown is that in one embodiment pointer generator 212 treats as "almost empty" FIFO buffer 210 when it is three (3) or less slots away from being completely empty; also shown is that in one embodiment "almost empty" is set as five (5) slots rather then three (3), for reasons of practicality.

Referring again to FIG. 2, on the "transmit", side of switch logic 202 modified SONET node 200 is made to appear "as if" it were unmodified SONET node 100 via the activities of pointer interpreter 214 and pointer generator 218. Pointer interpreter 214 interprets the overhead columns of non-standard SONET frame 206 and writes the payload (SPE) columns of non-standard SONET frame 206 into FIFO buffer 216. Pointer generator 218 interacts with pointer interpreter 214 to obtain the 27 bytes of overhead data (3 columns/row×9 rows/SONET frame×1 byte/column (for STS-1 frames) yields 27 columns of overhead data/SONET frame—for STS-1; numbers would be multiplied by factor of N other STSes, such as STS-N were in use) in order to construct the 3 columns×9 row overhead data structures of standard SONET frame 110, where each 3 column overhead data structure has appended to it 87 columns of payload data for the row to which each 3 column overhead data structure belongs.

It has been discovered by the inventors that since pointer interpreter 214 and pointer generator 218 are associated with different frame structures (e.g., non-standard SONET frame 206 and standard SONET frame 110 respectively), a status of "almost full" or "almost empty" for a FIFO buffer 216 will vary dependent upon whether FIFO buffer 216 is being viewed from the standpoint of pointer interpreter 214 or pointer generator 218. For example, since pointer generator 218 tends to cooperate in reading 87 column "chunks" of payload data (e.g., the number of columns between overhead columns), a status of "almost empty" and "almost full" from the standpoint of pointer generator 218 will be different from that seen by pointer interpreter 214, which tends to interpret the 27 byte overhead data structure of non-standard SONET frame 206 prior to writing any data into FIFO buffer 216.

That is, insofar as pointer interpreter 214 generally processes all 27 columns of overhead data prior to writing any payload data to FIFO buffer 216, in order to ensure that loss of data continuity does not occur, pointer generator 218 should treat the "almost empty" condition as that condition which FIFO buffer 216 is at least 27 bytes away from being empty, in order to account for the eventuality that pointer generator might be interpreting the 27 byte overhead data structure of non-standard SONET frame 206 at some particular interval in time during which pointer generator 218 is reading data, so that pointer generator 218 can prepare to do positive stuffing should the need arise.

Conversely, insofar as pointer interpreter 214 is concerned, there could be instances in which pointer generator 218 is constructing three columns of overhead data and not reading data from FIFO buffer 216. Consequently, in order to be safe, pointer interpreter 214 preferably should treat the "almost full" condition as being 3 or less columns of data away from a completely full FIFO buffer 216 (which for an STS-1 frame equates to 3 bytes); however, in at least one implementation it has been empirically determined that due to practical considerations it is useful to have the "almost empty" indicator set to 5 columns, which for an STS-1 frame equates to 5 bytes.

Figure 4A:
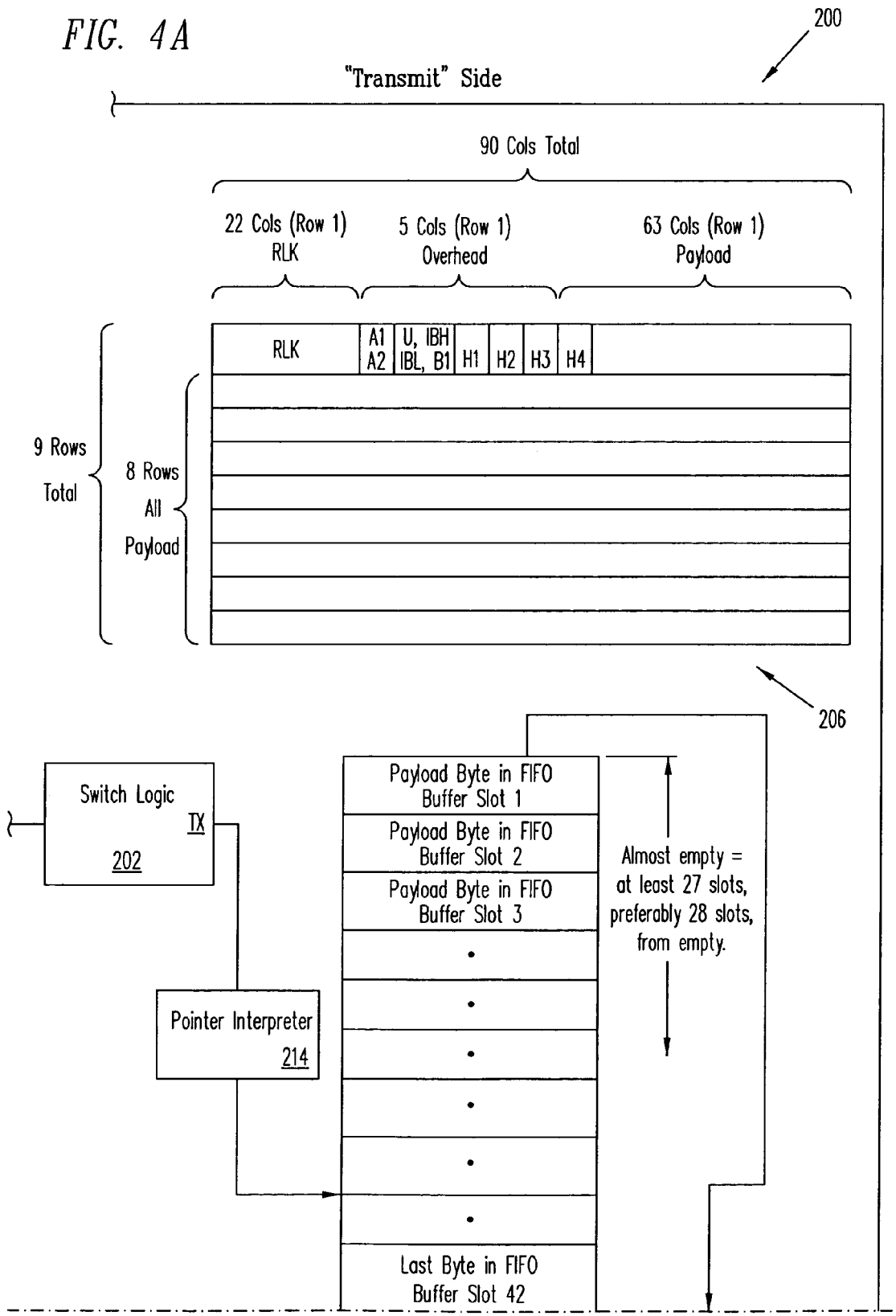
FIG. 4 shows an expanded partial view of the "transmit" side of switch logic 202 wherein it is shown that in one embodiment pointer interpreter 214 treats as "almost full" FIFO buffer 216 when it is three (3) or less slots (where each slot is of size sufficient to hold at least one column of SPE data) away from being completely full; also shown is that in one embodiment "almost full" is set as five (5) slots rather than three (3), for reasons of practicality.
Figure 4B:
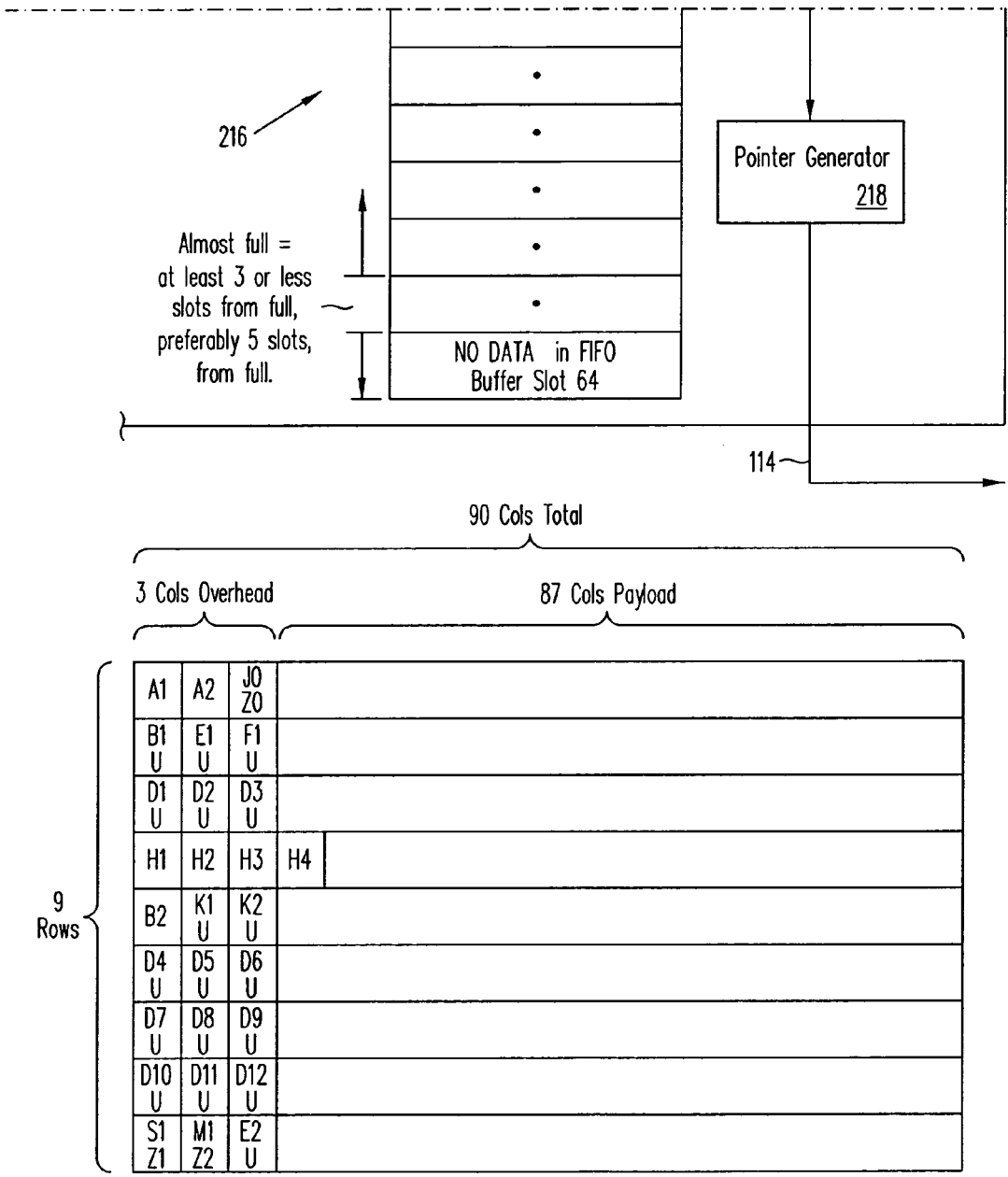
Figure 4:
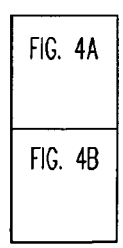

Referring now to FIG. 4, shown is an expanded partial view of the "transmit" side of switch logic 202 wherein it is shown that in one embodiment pointer interpreter 214 treats as "almost full" FIFO buffer 210 when it is three (3) or less slots (where each slot is of size sufficient to hold at least one column of SPE data) away from being completely empty; also shown is that in one embodiment "almost full" is set as five (5) slots rather then three (3), for reasons of practicality. Also shown is that in one embodiment pointer generator 218 treats as "almost empty" FIFO buffer 210 when it is twenty-seven (27) or less slots away from being completely full; also shown is that in one embodiment "almost empty" is set as twenty-eight (28) slots rather then twenty-seven (27), for reasons of practicality.

For sake of simplicity, the foregoing has demonstrated various almost empty and almost full settings for STS-1 frames. It will be appreciated by those in the art that the preceding examples need to be modified slightly for STS-N formats, since as described above the columns of STS-N frames will be N bytes (e.g., columns for STS-2 are 2 bytes wide, for STS-10 are 10 bytes wide, for STS 48 are 48 bytes wide, etc.).

The foregoing has described how to determine almost empty and almost full status of FIFO buffers when such buffers are keyed to non-standard SONET frames. Various embodiments use this information to determine when and whether positive and negative stuffing is to be done.

In various embodiments, with respect to FIFO buffer 210 (e.g., a buffer on the "receive" side of switch logic 202), pointer interpreter 208 examines the state of FIFO buffer 210 subsequent to writing sixteen columns (e.g., subsequent to writing 16 bytes for STS-1, 32 bytes for STS-2, 48 bytes for STS-3, etc.) of data to FIFO 210. The results of such examinations can be used in various embodiments ranging from "coarse" to "fine." In a coarse embodiment, the results of buffer examinations made just prior to a transition boundary between successive standard SONET frames received via ingress data link 112 are saved (because the large 27 column construct of the non-standard SONET is coincident with a period of time during which data may be being written to FIFO buffer 210 but not read out). If such buffer examinations associated with any two successive frames show that the buffer is in the "almost full" range at such transition points (e.g., two frames in succession end off with FIFO buffer 210 in an almost full condition), a decision is made for pointer interpreter 208 to engage in negative stuffing (and the pointers adjusted appropriately) as soon as practicable; in one embodiment, the most often negative stuffing can be done is once every four received standard SONET frame. In the more "fine" embodiments, a similar scheme to the foregoing is followed except that the decision to stuff is made on the basis of more than one examination before transitions between frames (e.g., based on the two examinations immediately preceding each transition point, which for two successive frames would result in the decision to stuff being based on 4 examinations of the buffer).

In various embodiments, with respect to FIFO buffer 210 (e.g., a buffer on the "receive" side of switch logic 202), pointer generator 212 examines the state of FIFO buffer 210 subsequent to reading sixteen columns (e.g., subsequent to reading 16 bytes for STS-1) of data from FIFO 210. The results of such examinations can be used in various embodiments ranging from "coarse" to "fine." In a coarse embodiment, the results of buffer examinations made just prior to a transition boundary between successive standard SONET frame rows are saved because each row of a frame begins with a 3 column overhead group during which data may possibly not be written to FIFO buffer 210 by pointer interpreter 208 but during which pointer generator 212 may be trying to read data out. If such buffer examinations associated with any two successive frames show that the buffer is in the "almost empty" range at such transition points (i.e., the examinations show two successive frames end off with the buffer in the almost empty condition)), a decision is made for the pointer generator to engage in positive stuffing (and the pointers adjusted appropriately) as soon as practicable; in one embodiment, the most frequently positive stuffing can be done is once per every four standard SONET frames received into modified SONET node 200 via ingress data link 112. In the more "fine" embodiments, a similar scheme to the foregoing is followed except that the decision to stuff is made on the basis of more than one examination before transitions between rows (e.g., based on the three examinations immediately preceding each transition point, which for two successive rows would result in the decision to stuff being based on six examinations of the buffer).

In various embodiments, with respect to FIFO buffer 216 (e.g., a buffer on the "transmit" side of switch logic 202), pointer generator 214 examines the state of FIFO buffer 216 subsequent to writing sixteen columns (e.g., subsequent to writing 16 bytes for STS-1, 32 bytes for STS-2, 48 bytes for STS-3, etc.) of data to FIFO 216. The results of such examinations can be used in various embodiments ranging from "coarse" to "fine." In a coarse embodiment, the results of buffer examinations made just prior to a transition boundary between successive non-standard SONET frames received via from switch logic 202 are saved (because the large 27 column construct of the non-standard SONET denotes a time in which data will not typically be being written to FIFO buffer 216, but during which data may be taken out). If such buffer examinations associated with any two successive frames show that the buffer is in the "almost full" range at such transition points (e.g., two successive frames end off with an almost full buffer, a decision is made for pointer generator 214 to engage in negative stuffing (and the pointers adjusted appropriately) as soon as practicable; in one embodiment, the most often negative stuffing can be done is once for every four standard SONET frames transmitted out of modified node 200 over egress data link 114. In the more "fine", embodiments, a similar scheme to the foregoing is followed except that the decision to stuff is made on the basis of more than one examination before transitions between frames (e.g., based on the two examinations immediately preceding each transition point, which for two successive frames would result in the decision to stuff being based on 4 examinations of the buffer).

In various embodiments, with respect to FIFO buffer 216 (e.g., a buffer on the "transmit" side of switch logic 202), pointer interpreter examines the state of FIFO buffer 216 subsequent to reading sixteen columns (e.g., subsequent to reading 16 bytes for STS-1) of data from FIFO 216. The results of such examinations can be used in various embodiments ranging from "coarse" to "fine." In a coarse embodiment, the results of buffer examinations made just prior to a transition boundary between successive standard SONET frames are saved because each row of a non-standard SONET frame begins with a 27 column overhead group during which data may possibly not be written to FIFO buffer 216 by pointer interpreter 214 but during which pointer generator 218 may be reading data. If such buffer examinations associated with any two successive frames show that the buffer is in the "almost empty" range at such transition points (i.e., pointer generator 218 ends off two successive frames with FIFO buffer 216 in an "almost empty" condition), a decision is made for pointer generator 218 to engage in positive stuffing (and the pointers adjusted appropriately) as soon as practicable; in one embodiment, the most frequently positive stuffing can be done is once per every four standard SONET frames transmitted from modified SONET node 200 via egress data link 114. In the more "fine" embodiments, a similar scheme to the foregoing is followed except that the decision to stuff is made on the basis of more than one examination before transitions between frames (e.g., based on the three examinations immediately preceding each transition point, which for two successive rows would result in the decision to stuff being based on six examinations of the buffer).

Figure 5:
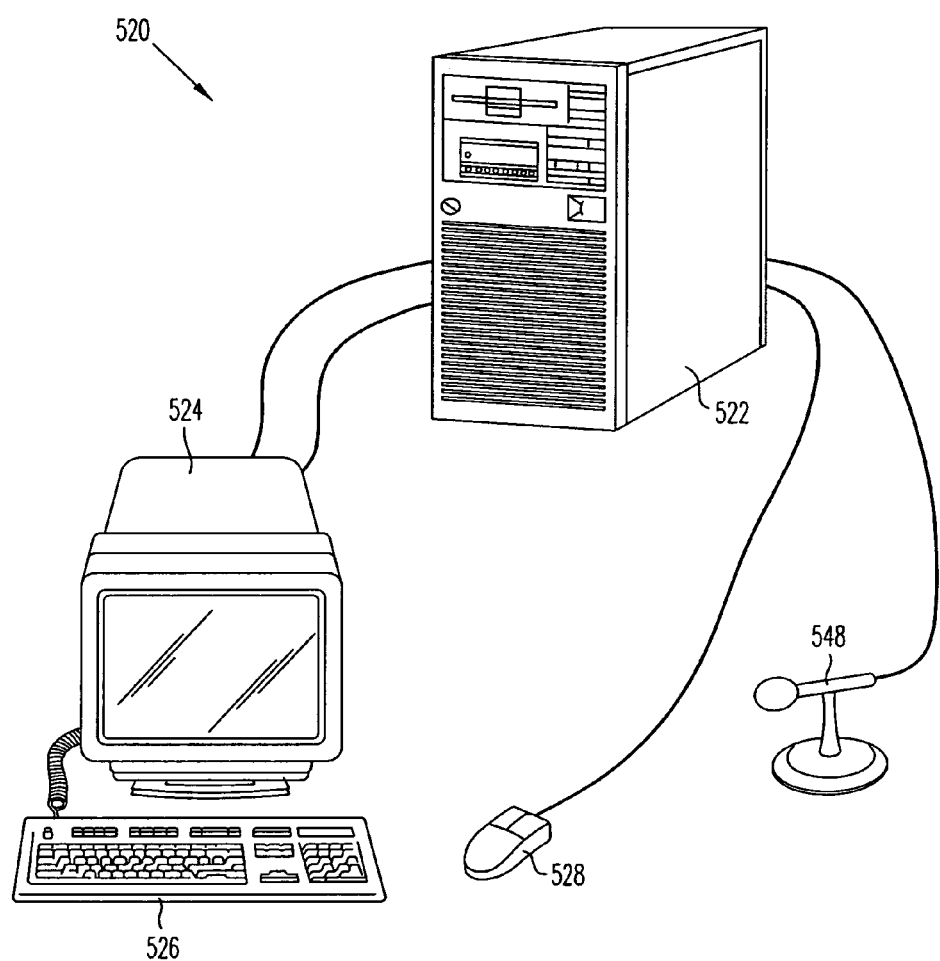
FIG. 5 illustrates a pictorial representation of a conventional data processing system which can be utilized in accordance with illustrative embodiments of embodiments described herein.

With reference now to FIG. 5, depicted is a pictorial representation of a conventional data processing system which can be utilized in accordance with illustrative embodiments of the processes described herein. It should be noted that a graphical user interface systems (e.g., Microsoft Windows 98 or Microsoft Windows NT operating systems) and methods can be utilized with the data processing system depicted in FIG. 5. Data processing system 520 is depicted which includes system unit housing 522, video display device 524, keyboard 526, mouse 528, and microphone 548. Data processing system 520 may be implemented utilizing any suitable data processing system such as those manufactured and/or distributed by CISCO systems located in San Jose, Calif. and Dallas, Tex. (CISCO is a trademark of Cisco Systems, Incorporated; the data processing systems distributed and/or manufactured by Cisco also typically have associated with them switches and switching logic, such switches and switching logic including but not limited to optical switches for SONET), or Dell Computer Corporation located in Round Rock, Tex. (DELL is a trademark of Dell Computer Corporation). Those skilled in the art will recognize that such conventional data processing systems will generally have a main data processing system board typically including by not limited to at least one processor (e.g., main processor, graphics processor, sound processor, etc.), at least one memory (RAM, DRAM, ROM) and at least one communications device (e.g., a network card or modem (optical or electronic)). In one embodiment, a Cisco Systems ONS (Optical Network System) 15900 Series Wavelength Router can be utilized in accordance with illustrative embodiments of the processes described herein. (CISCO, and "ONS 15900 Series Wavelength Router" are trademarks of Cisco Systems, Incorporated).

The foregoing detailed description has set forth various embodiments of the present invention via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present invention may be implemented via logic encoded in a BIOS associated with a processor, while in another embodiment the present invention may be implemented via logic encoded in Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include but are not limited to the following: recordable type media such as floppy disks, hard disk drives, CD ROMs, digital tape, and transmission type media such as digital and analogue communication links using TDM or IP based communication links (e.g., packet links).

The foregoing described embodiments depict different components contained within, or connected with, different other components. It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such intent is present. For example, as an aid to understanding, the following appended claims may contain usage of the introductory phrases "at least one"and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements. In addition, even if a specific number of an introduced claim element is explicitly recited, those skilled in the art will recognize that such recitation should typically be interpreted to mean at least the recited number (e.g., the bare recitation of "two elements," without other modifiers, typically means at least two elements, or two or more elements).

What is claimed is:

1. A method for determining a status of a buffer for use in converting between a standard SONET and a non-standard SONET frame, said method comprising:
    determining the buffer's almost empty or almost full status based on a length of a transport gap of the non-standard SONET frame, wherein
        the standard SONET frame is formatted as a STS-N, and
        the transport gap of the non-standard SONET frame has been rearranged to provide a longer non-data region at the beginning of the non-standard SONET frame; and
    performing positive or negative stuffing using the buffer's almost empty or almost full status.

2. The method of claim 1, wherein said determining the buffer's almost empty or almost full status based on the transport gap of the non-standard SONET frame further comprises:
    determining a transmit buffer's almost empty or almost full status based on the transport gap of the non-standard SONET frame.

3. The method of claim 2, wherein said determining the transmit buffer's almost empty or almost full status based on the transport gap of the non-standard SONET frame further comprises:
    the transmit buffer interposed between a pointer interpreter which receives data from a switching matrix and a pointer generator which prepares the standard SONET frame.

4. The method of claim 2, wherein said determining the transmit buffer's almost empty or almost full status based on the transport gap of the non-standard SONET frame further comprises:
    determining the transmit buffer's almost empty or almost full status based on at least a column length of the transport gap of the non-standard SONET frame.

5. The method of claim 4, wherein each column of the transport gap of the non-standard SONET frame contains 1 byte per each STS channel in use.

6. The method of claim 4, wherein said determining the transmit buffer's almost empty or almost full status based on at least a column length of the transport gap of the non-standard SONET frame further comprises:
    configuring a pointer generator constructed to read data from the transmit buffer to at least a column length of the transport gap of the non-standard SONET frame.

7. The method of claim 6, wherein said configuring the pointer generator constructed to read data from the transmit buffer to at least a column length of the transport gap of the non-standard SONET frame further comprises:
    accepting input specifying a substantially 28-column almost-empty range for the pointer generator constructed to read data from the transmit buffer.

8. The method of claim 4, wherein said determining the transmit buffer's almost empty or almost full status based on at least a column length of the transport gap of the non-standard SONET frame further comprises:
    configuring a pointer interpreter constructed to write data to the transmit buffer to at least a column length of the transport gap of the non-standard SONET frame.

9. The method of claim 8, wherein said configuring the pointer interpreter constructed to write data to the transmit buffer to at least a column length of the transport gap of the non-standard SONET frame further comprises:
    accepting input specifying a substantially 5-column almost-full range for the pointer interpreter constructed to write data to the transmit buffer.

10. The method of claim 1, wherein said determining the buffer's almost empty or almost full status based on the transport gap of the non-standard SONET frame further comprises:
    determining a receive buffer's almost empty or almost full status based on the transport gap of the non-standard SONET frame.

11. The method of claim 10, wherein said determining the receive buffer's almost empty or almost full status based on the transport gap of the non-standard SONET frame further comprises:
    the receive buffer interposed between a pointer generator which feeds data to a switching matrix and a pointer interpreter which receives data.

12. The method of claim 10, wherein said determining the receive buffer's almost empty or almost full status based on the transport gap of the non-standard SONET frame further comprises:
    determining the receive buffer's almost empty or almost full status based on at least a column length of the transport gap of the non-standard SONET frame.

13. The method of claim 12, wherein each column of the transport gap of the non-standard SONET frame contains 1 byte per each STS channel in use.

14. The method of claim 12, wherein said determining the receive buffer's almost empty or almost full status based on at least the column length of the transport gap of the non-standard SONET frame further comprises:
    configuring a pointer generator constructed to read data from the receive buffer to at least the column length of the transport gap of the non-standard SONET frame.

15. The method of claim 14, wherein said configuring a pointer generator constructed to read data from the receive buffer to at least the column length of the transport gap of the non-standard SONET frame further comprises:
    accepting input specifying a substantially 5-column almost-empty range for the pointer generator constructed to read data from the receive buffer.

16. The method of claim 12, wherein said determining the receive buffer's almost empty or almost full status based on at least the column length of the transport gap of the non-standard SONET frame further comprises:

configuring a pointer interpreter constructed to write data to the receive buffer to at least a column length of the transport gap of the non-standard SONET frame.

17. The method of claim 16, wherein said configuring a pointer interpreter constructed to write data to the receive buffer to at least the column length of the transport gap of the non-standard SONET frame further comprises:

accepting input specifying a substantially 28-column almost-full range for the pointer interpreter constructed to write data to the receive buffer.

18. A system for determining a status of a buffer for use in converting between a standard SONET and a non-standard SONET frame, said system comprising:

means for determining the buffer's almost empty or almost full status based on a length of a transport gap of the non-standard SONET frame, wherein the standard SONET frame is formatted as a STS-N, and the transport gap of the non-standard SONET frame has been rearranged to provide a longer non-data region at the beginning of the non-standard SONET frame; and means for performing positive or negative stuffing using the buffer's almost empty or almost full status.

19. The system of claim 18, wherein said means for determining the buffer's almost empty or almost full status based on the length of a transport gap of the non-standard SONET frame further comprises:

means for determining a transmit buffer's almost empty or almost full status based on the transport gap of the non-standard SONET frame.

20. The system of claim 19, wherein said means for determining a transmit buffer's almost empty or almost full status based on the transport gap of the non-standard SONET frame further comprises:

the transmit buffer interposed between a pointer interpreter which receives data from a switching matrix and a pointer generator which prepares the a standard SONET frame.

21. The system of claim 19, wherein said means for determining a transmit buffer's almost empty or almost full status based on the transport gap of the non-standard SONET frame further comprises:

means for determining the transmit buffer's almost empty or almost full status based on at least a column length of the transport gap of the non-standard SONET frame.

22. The system of claim 21, wherein each column of the transport gap of the non-standard SONET frame contains 1 byte per each STS channel in use.

23. The system of claim 21, wherein said means for determining the transmit buffer's almost empty or almost full status based on at least the column length of the transport gap of the non-standard SONET frame further comprises:

means for configuring a pointer generator constructed to read data from the transmit buffer to at least the column length of the transport gap of the non-standard SONET frame.

24. The system of claim 21, wherein said means for determining the transmit buffer's almost empty or almost full status based on at least the column length of the transport gap of the non-standard SONET frame further comprises:

means for configuring a pointer interpreter constructed to write data to the transmit buffer to at least the column length of the transport gap of the non-standard SONET frame.

25. The system of claim 18, wherein said means for determining the buffer's almost empty or almost full status based on the length of a transport gap of the non-standard SONET frame further comprises:

means for determining a receive buffer's almost empty or almost full status based on a transport gap of the non-standard SONET frame.

26. The system of claim 25, wherein said means for determining a receive buffer's almost empty or almost full status based on the transport gap of the non-standard SONET frame further comprises:

the receive buffer interposed between a pointer generator which feeds data to a switching matrix and a pointer interpreter which receives data.

27. The system of claim 25, wherein said means for determining a receive buffer's almost empty or almost full status based on the transport gap of the non-standard SONET frame further comprises:

means for determining the receive buffer's almost empty or almost full status based on at least the column length of the transport gap of the non-standard SONET frame.

28. The system of claim 27, wherein each column of the transport gap of the non-standard SONET frame contains 1 byte per each STS channel in use.

29. The system of claim 27, wherein said means for determining the receive buffer's almost empty or almost full status based on at least the column length of the transport gap of the non-standard SONET frame further comprises:

means for configuring a pointer generator constructed to read data from the receive buffer to at least the column length of the transport gap of the non-standard SONET frame.

30. The system of claim 27, wherein said means for determining the receive buffer's almost empty or almost full status based on at least the column length of the transport gap of the non-standard SONET frame further comprises:

means for configuring a pointer interpreter constructed to write data to the receive buffer to at least the column length of the transport gap of the non-standard SONET frame.

31. A SONET node comprising:

at least one pointer interpreter having an almost full buffer detector set substantially equal to a number of columns present in a transport gap of a non-standard SONET frame, wherein a standard SONET frame is formatted as an STS-N, and the transport gap of the non-standard SONET frame has been rearranged to provide a longer non-data region at the beginning of the non-standard SONET frame.

32. The SONET node of claim 31, wherein the number of columns present in the transport gap of the non-standard SONET frame comprises 27 columns of data.

33. The SONET node of claim 32, wherein each of the columns comprises at least one byte of data for each STS channel in use.

34. The SONET node of claim 31, wherein the SONET node further comprises one or more components selected from the group comprising a processor, a memory device, a bus, and a communications device.

35. A SONET node comprising:

at least one pointer generator having an almost empty buffer detector set substantially equal to a number of columns present in a transport gap of a non-standard SONET frame, wherein
a standard SONET frame is formatted as an STS-N, and
the transport gap of the non-standard SONET frame has been rearranged to provide a longer non-data region at the beginning of the non-standard SONET frame.

36. The SONET node of claim 35, wherein the number of columns present in the transport gap of the non-standard SONET frame comprises 27 columns of data.

37. The SONET node of claim 36, wherein each of the columns comprises at least one byte of data for each STS channel in use.

38. The SONET node of claim 35, wherein the SONET node further comprises one or more components selected from the group comprising a processor, a memory device, a bus, and a communications device.

39. A method for maintaining communications comprising:
detecting a transition involving at least one non-standard SONET frame, wherein
a standard SONET frame is formatted as a STS-N, and
the transport gap of the non-standard SONET frame has been rearranged to provide a longer non-data region at the beginning of the non-standard SONET frame;
in response to said detecting yielding a determination that a receive FIFO buffer is almost full during the transition involving at least one non-standard SONET frame, engaging in negative stuffing; and
in response to said detecting yielding a determination that a receive FIFO buffer is almost empty during the transition involving at least one non-standard SONET frame, engaging in positive stuffing.

40. The method of claim 39, wherein the determination that a receive buffer is almost full comprises:
detecting that the receive FIFO buffer has less empty space than that required to buffer data during construction of a transport gap of the non-standard SONET frame.

41. The method of claim 40, wherein said detecting that the receive FIFO buffer has less empty space than that required to buffer data during construction of a transport gap of the non-standard SONET frame further comprises:
detecting that the receive FIFO buffer has space less than or equal to twenty-eight columns of data when the transport gap of the non-standard SONET frame is twenty-seven columns of one row of the non-standard SONET frame of data in size.

42. The method of claim 39, wherein the determination that the receive FIFO buffer is almost empty comprises:
detecting that the receive FIFO buffer has less full space than that required to ensure a constant outflow of data from the receive FIFO buffer during interpretation of a transport gap of a standard SONET frame.

43. The method of claim 42, wherein said detecting that the receive FIFO buffer has less full space than that required to ensure a constant outflow of data from the receive FIFO buffer during interpretation of the transport gap of a standard SONET frame further comprises:
detecting that the receive FIFO buffer has space less than or equal to five columns of data when the transport gap of the standard SONET frame is three columns of data in size.

44. A system for maintaining communications comprising:
means for detecting a transition involving at least one non-standard SONET frame, wherein
a standard SONET frame is formatted as a STS-N, and
the transport gap of the non-standard SONET frame has been rearranged to provide a longer non-data region at the beginning of the non-standard SONET frame;
means, responsive to said means for detecting yielding a determination that a receive FIFO buffer is almost full during the transition involving at least one non-standard SONET frame, for engaging in negative stuffing; and
means, responsive to said means for detecting yielding a determination that a receive FIFO buffer is almost empty during the transition involving at least one non-standard SONET frame, for engaging in positive stuffing.

45. The system of claim 44, wherein said means, responsive to said means for detecting yielding a determination that a receive FIFO buffer is almost full during the transition involving at least one non-standard SONET frame, for engaging in negative stuffing further comprises:
means for detecting that the receive FIFO buffer has less empty space than that required to buffer data during construction of the transport gap of the non-standard SONET frame.

46. The system of claim 45, wherein said means for detecting that the receive FIFO buffer has less empty space than that required to buffer data during construction of the transport gap of the non-standard SONET frame further comprises:
means for detecting that the receive FIFO buffer has space less than or equal to twenty-eight columns of data when the transport gap of the non-standard SONET frame is twenty-seven columns of one row of the non-standard SONET frame of data in size.

47. The system of claim 44, wherein said means, responsive to said means for detecting yielding a determination that a receive FIFO buffer is almost empty during the transition involving at least one non-standard SONET frame, for engaging in positive stuffing further comprises:
means for detecting that the receive FIFO buffer has less full space than that required to ensure a constant outflow of data from the receive FIFO buffer during interpretation of a transport gap of a standard SONET frame.

48. The system of claim 47, wherein said means for detecting that the receive FIFO buffer has less full space than that required to ensure a constant outflow of data from the receive FIFO buffer during interpretation of a transport gap of a standard SONET frame further comprises:
means for detecting that the receive FIFO buffer has space less than or equal to five columns of data when the transport gap of the standard SONET frame is three columns of data in size.

49. A method for maintaining communications comprising:
detecting a transition involving at least one non-standard SONET frame, wherein
standard SONET frame is formatted as a STS-N, and
the transport gap of the non-standard SONET frame has been rearranged to provide a longer non-data region at the beginning of the non-standard SONET frame;
in response to said detecting yielding a determination that a transmit FIFO buffer is almost full during the transition involving at least one non-standard SONET frame, engaging in negative stuffing; and
in response to said detecting yielding a determination that a transmit FIFO buffer is almost empty during the transition involving at least one non-standard SONET frame, engaging in positive stuffing.

50. The method of claim 49, wherein the determination that the transmit FIFO buffer is almost full comprises:
detecting that the transmit FIFO buffer has less empty space than that required to buffer data during construction of the transport gap of the standard SONET frame.

51. The method of claim 50, wherein said detecting that the transmit FIFO buffer has less empty space than that required to buffer data during construction of the transport gap of the standard SONET frame further comprises:
  detecting that the transmit FIFO buffer has space less than or equal to five columns of data when the transport gap of the standard SONET frame is three columns of data in size.

52. The method of claim 49, wherein the determination that the transmit FIFO buffer is almost empty comprises:
  detecting that the transmit FIFO buffer has less empty space than that required to buffer data during interpretation of the transport gap of the non-standard SONET frame.

53. The method of claim 52, wherein said detecting that the transmit FIFO buffer has less empty space than that required to buffer data during interpretation of the transport gap of the non-standard SONET frame further comprises:
  detecting that the transmit FIFO buffer has space less than or equal to twenty-eight columns of data when the transport gap of the non-standard SONET frame is twenty-seven columns of one row of the non-standard SONET frame of data in size.

54. A system for maintaining communications comprising:
  means for detecting a transition involving at least one non-standard SONET frame, wherein
    a standard SONET frame is formatted as a STS-N, and
    the transport gap of the non-standard SONET frame has been rearranged to provide a longer non-data region at the beginning of the non-standard SONET frame;
  means, responsive to said means for detecting yielding a determination that a transmit FIFO buffer is almost full during the transition involving at least one non-standard SONET frame, for engaging in negative stuffing; and
  means, responsive to said means for detecting yielding a determination that a transmit FIFO buffer is almost empty during the transition involving at least one non-standard SONET frame, for engaging in positive stuffing.

55. The system of claim 54, wherein said means, responsive to said means for detecting yielding a determination that a transmit FIFO buffer is almost full during the transition involving at least one non-standard SONET frame, for engaging in negative stuffing further comprises:
  means for detecting that the transmit FIFO buffer has less empty space than that required to buffer data during construction of the transport gap of the standard SONET frame.

56. The system of claim 55, wherein said means for detecting that the transmit FIFO buffer has less empty space than that required to buffer data during construction of the transport gap of the standard SONET frame further comprises:
  means for detecting that the transmit FIFO buffer has space less than or equal to five columns of data when the transport gap of the standard SONET frame is three columns of data in size.

57. The system of claim 54, wherein said means, responsive to said means for detecting yielding a determination that a transmit FIFO buffer is almost empty during the transition involving at least one non-standard SONET frame, for engaging in positive stuffing further comprises:
  means for detecting that the transmit FIFO buffer has less empty space than that required to buffer data during interpretation of the transport gap of the non-standard SONET frame.

58. The system of claim 57, wherein said means for detecting that the transmit FIFO buffer has less empty space than that required to buffer data during interpretation of the transport gap of the non-standard SONET frame further comprises:
  means for detecting that the transmit FIFO buffer has space less than or equal to twenty-eight columns of data when the transport gap of the non-standard SONET frame is twenty-seven columns of one row of the non-standard SONET frame of data in size.

* * * * *

UNITED STATES PATENT AND TRADEMARK OFFICE
CERTIFICATE OF CORRECTION

PATENT NO. : 6,957,246 B1  
APPLICATION NO. : 09/583966  
DATED : October 18, 2005  
INVENTOR(S) : Hall et al.

Page 1 of 1

It is certified that error appears in the above-identified patent and that said Letters Patent is hereby corrected as shown below:

Col. 16, Line 51,  
At claim 49, line 5, please insert "a" before "standard"

Signed and Sealed this

Twenty-fifth Day of July, 2006

JON W. DUDAS  
*Director of the United States Patent and Trademark Office*